April 12, 1966 W. B. STUHLER 3,245,546

SELF-LOCKING HANDLE

Filed Sept. 14, 1964

INVENTOR.
WILLIAM B. STUHLER

BY Marvin Moody

ATTORNEY

United States Patent Office 3,245,546
Patented Apr. 12, 1966

3,245,546
SELF-LOCKING HANDLE

William B. Stuhler, Garland, Tex., assignor to Collins Radio Company, Cedar Rapids, Iowa, a corporation of Iowa Filed Sept. 14, 1964, Ser. No. 396,312
9 Claims. (Cl. 211—41)

This invention relates in general to a self-locking handle and in particular to a flexible handle particularly adaptable for use with printed circuit boards.

As electronic equipment becomes more and more compact, printed circuit boards with numerous components mounted on them have come into use. Such boards are mounted in card cages formed with slots with numerous boards held in a parallel relationship. It is desirable to have such boards locked into the slots so that they will not lose electrical contact and be rendered inoperative. If a particular board becomes inoperative, or out of adjustment, it is necessary to remove the board and replace it with a duplicate.

It is an object of the present invention therefore to provide a self-locking handle for use with printed circuit boards mounted closely adjacent to each other which locks the boards into place in the card cage, but which allows the boards to be easily removed from the cage.

Another object of this invention is to provide a flexible handle for a printed circuit board.

A feature of this invention is found in the provision for a flexible handle attached to a printed circuit board which may be moved to a locked relationship with a card cage or to an unlocked position.

Further objects, features, and advantages of this invention will become apparent from the following description and claims when read in view of the accompanying drawings, in which:

Figures 1, 2, 3, 4:
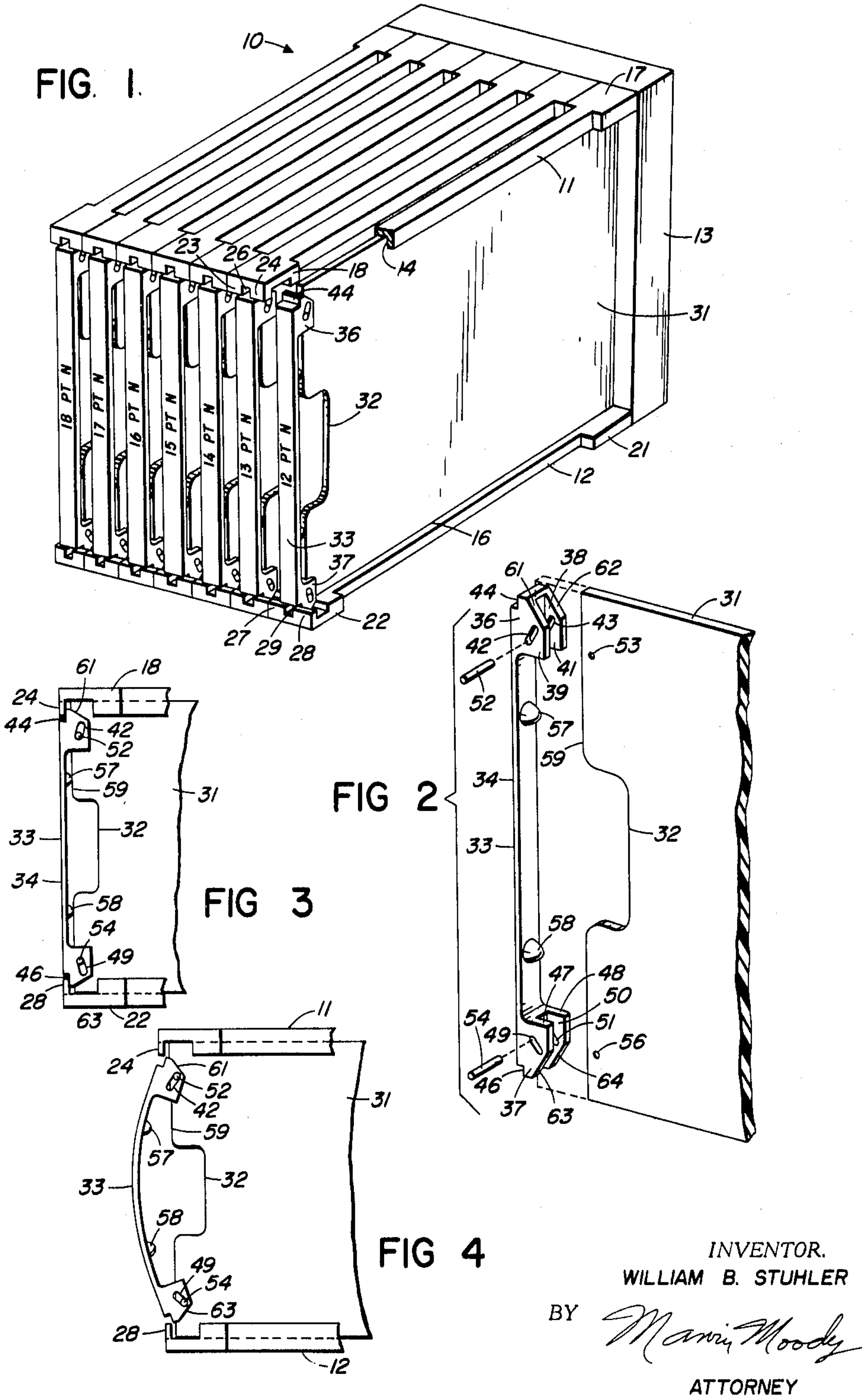
FIGURE 1 is a perspective view of a plurality of printed circuit boards mounted in a card cage.
FIGURE 2 is an exploded view of a flexible handle of this invention.
FIGURE 3 is a side view of the handle of this invention in the locked position.
FIGURE 4 is a side view of the handle in the unlocked position.

FIGURE 1 illustrates a printed circuit card cage designated generally as 10 which consists of slotted holders 11 and 12 attached to a structural member 13. The top holder 11 is formed with a slot 14 and the bottom holder 12 is formed with a slot 16. The ends of top holder 11 are enlarged to form portions 17 and 18. Adjacent portions 17 are attached to the structural member 13 and abut against adjacent guide members. The bottom guide member 12 is formed with enlarged portions 21 and 22 at either end.

Portion 21 is attached to frame member 13 and the portions 22 engage adjacent enlarged portions 22 of other bottom guides. The enlarged portion 18 is formed with a pair of lips 23 and 24 which are separated by a slot 26. Likewise, the portion 22 is formed with a pair of lips 27 and 28 which are separated by a slot 29.

Printed circuit cards 31 are receivable in the top and bottom guides 11 and 12 and through slots 26 and 29 in the enlarged portions 18 and 22. The printed circuit boards 31 are formed with a plurality of electrical circuits thereon in a conventional manner. The cards are formed with a cutout portion 32 adjacent their outer edges 59.

A handle 33 of flexible material is attached to each printed circuit board 31 at its front edge. As best shown in FIGURE 2, the handle consists of a central portion 34 and a pair of end portions 36 and 37. The end portion 36 is formed with a slot 38 into which the card 31 is received between the two parallel side members 39 and 41. A transverse slot 42 is formed in portion 39 and another transverse slot 43 is formed in portion 41. A locking lip 44 is formed on end portion 36. End portion 37 is similar in all respects to end portion 36 having locking lip 46 and a pair of parallel sides 47 and 48 separated by slot 50 and formed with transverse slots 49 and 51. A locking pin 52 is insertable through slots 42 and 43 and an opening 53 of the printed circuit card 31. The pin is press fitted through the board 31 so that it will not move once it is in place. Similarly, a pin 54 is receivable through slots 49 and 51 and is press fitted through an opening 56 formed in the card 31.

A pair of nipples 57 and 58 are formed on the side of the handle facing the card 31 above and below, respectively, the cutout 32.

In use, a number of printed circuit boards 31 are mounted in closely spaced adjacent guides as shown in FIGURE 1. The handle of this invention allows a particular one of the boards so mounted to be removed and assures that those which are to remain in place remain firmly locked. Assuming that a particular board 31 is in place and locked, the handle will assume the position shown in FIGURE 3. The locking lips 44 and 46 will engage the portions 23, 24 and 27, 28 to lock the board in the holder. The central portion 34 of the handle will be substantially straight with the pins 52 and 54 lying adjacent to the bottom and top respectively of slots 42 and 49. The nipples 57 and 58 will engage the edge 59 of the card. The locking arrangement of lips 44 and 46 with the edges 23, 24 and 27, 28 assure that the card will not accidentally move from the cage holder.

If a particular one of the printed circuit boards is to be removed, the handle for the particular board may be grasped between the fingers. This is facilitated by the cutout 32 formed in the cards in that the handles located immediately adjacent of either side of the board to be removed can be depressed and thus allow handle 33 of the selected boards to be firmly grasped. As the central portion 34 of the handle is pulled, the ends 36 and 37 will be pivoted and pins 52 and 54 will move in slots 42, 43, and 49, 51, allowing the handle to be unlocked by the lips 44 and 46 moving out of engagement with locking lips 23, 24 and 27, 28. The unlocked position is illustrated in FIGURE 4. Further pulling on handle 33 will remove the printed circuit board 31 from the slotted guides 11 and 12 of the card cage.

When a board is to be inserted and locked into the card cage, the center portion of the handle 34 is pushed until the printed circuit board is substantially within the cage. The portions of enlarged portions 36 and 37 facing the card cage are formed with cammed surfaces 61, 62, 63 and 64. These surfaces engage the members 23, 24 and 27, 28, respectively, to move lips 44 and 46 until they lock behind the members 23, 24 and 27, 28.

The cammed surfaces 61, 62, 63 and 64 are cut at an angle to optimize the camming effect. Likewise, the slots 42, 43, 49 and 51 are formed at an angle to allow the most efficient utilization.

The nipples 57 and 58 may be eliminated if desired. They amplify the pivoting of the ends of the handle as the center portion 34 is pushed into the cutout 32.

The nipples 57 and 58 facilitate pivoting of the ends 36 and 37 on pins 52 and 54. The slots 42, 43 and 49, 51 allow relative motion between the card 31 and the handle to obtain the locking and unlocking action.

As shown in FIGURE 1, various cards may be lettered with identifying numerals and letters to easily identify particular cards. Also the handles may be easily constructed from various colored plastics which may be used to identify different kinds of printed circuit boards.

The device consists of a one-piece molded plastic handle which provides easier removal of printed circuits from card cages and also provides positive locking of the circuit card. Advantages of this handle are as follows:

(1) The flexure of the handle allows a full finger grip when removing the board. This is not possible with rigid handles where boards are stacked closely together as in most computers and similar equipment.

(2) The handle requires less usable board space than other types, leaving maximum board area for circuitry. This is important where overall board size is standardized and component density high.

(3) It eliminates need for separate card retainers, since this feature is provided in the handle itself.

(4) The handle width is almost equal to the board width, which provides maximum space for marking of nomenclature.

(5) Due to its one-piece molded construction and simplicity of assembly (2 holes are required in board, and 2 roll pins for assembly) the cost is very low as compared to present handles and card retainers.

(6) Provides for color-coding of circuits by using different color plastic.

It is seen that this invention provides a self-locking handle for printed circuit boards or other similar devices. Although this invention has been described with respect to particular embodiments thereof, it is not to be so limited, as changes and modifications may be made therein which are within the spirit and scope of the invention as defined by the appended claims.

I claim:

1. A flexible handle in combination with a planar member, the handle connectable to the edge of the planar member, the handle comprising a center portion and a pair of end portions, each of said end portions formed with a slot into which the planar member is received, a pair of pins extending from the planar member on either side thereof and passing through loose openings formed through the end portions of the handle to permit the handle to flex.

2. A self-locking handle in combination with a planar member, said handle comprising a flexible center portion and formed with enlarged ends, said enlarged ends formed with locking lips, said enlarged ends formed with slots into which the end of the planar member is received and means for attaching the ends of said handle pivotally and slidably to the planar member.

3. The combination according to claim 2 wherein the means for attaching the ends of said handle member to the planar member comprise transverse slots formed through the two enlarged ends, a first pin passing through the slots in the first end and attached to the planar member, and a second pin passing through the slots in the second end and attached to the planar member.

4. The combination according to claim 3 a portion of the planar member adjacent to the center portion of the handle removed to form an indention.

5. The combination according to claim 4 including a pair of nipples formed on the back side of the handle member at opposite sides of the indention in the planar member to form pivot points by contacting the end of the planar member.

6. The combination of a locking handle a card and a card cage, said cage comprising a frame member having top and bottom slotted guides connected at one end and open at the other end and formed with top and bottom locking means with the locking means engageable with the open ends of the slotted guides, said card slidably received in said top and bottom guides, said flexible handle attached to the outer edge of said card by transverse pins attached to the card and extending through slots formed in the flexible handle and formed with locking lips detachably connectable to the locking means of the frame member.

7. The combination according to claim 6 wherein a portion is removed from the center of the edge of the card upon which the flexible handle is attached.

8. The combination of a planar member and holder and means to lock the member to the holder, said holder having upper and lower slotted guides connected together at one end, the outer ends of said upper and lower slotted guides formed with locking lips, said means including a flexible handle with opposite ends having means pivotally and slidably connected to the outer edge of the planar member and the ends of said flexible handle formed with locking extensions engageable with the locking lips of said upper and lower guides to lock the planar member to the holder.

9. The combination according to claim 8 wherein the ends of the flexible handle are formed with cammed surfaces on the side toward the planar member to allow camming of the ends of the flexible handle as the planar member is inserted into the upper and lower guides to cause the locking extensions to lock with the locking lips.

References Cited by the Examiner

UNITED STATES PATENTS

| | | | |
|---|---|---|---|
| 947,404 | 1/1910 | Andrazyk | 292—85 |
| 1,045,846 | 12/1912 | Hofen | 292—57 |
| 2,900,074 | 8/1959 | Windman | 206—62 |
| 3,184,069 | 5/1965 | Rosenberg | 211—41 |
| 3,186,554 | 6/1965 | Mack et al. | 211—41 |

CLAUDE A. LE ROY, *Primary Examiner.*

W. D. LOULAN, *Assistant Examiner.*